United States Patent [19]

Liu

[11] Patent Number: 4,817,238

[45] Date of Patent: Apr. 4, 1989

[54] PNEUMATIC DOOR-CLOSER HAVING A CLOSABLE PASSAGE AND A REGULATABLE PASSAGE

[76] Inventor: James C. Liu, No. 308, Fu-Sheng Tsun, Hsin-Shen Hsiang, Taichung Hsien, Taiwan

[21] Appl. No.: 201,532

[22] Filed: Jun. 2, 1988

[51] Int. Cl.$^4$ .............................................. E05F 3/02
[52] U.S. Cl. .......................................... 16/66; 16/84; 16/58; 16/DIG. 10
[58] Field of Search ................... 16/49, 51, 52, 58, 66, 16/72, 84, DIG. 9, DIG. 10; 92/181 D; 91/422

[56] References Cited

U.S. PATENT DOCUMENTS

| | | | |
|---|---|---|---|
| 2,953,810 | 9/1960 | Hall | 16/52 |
| 3,555,591 | 1/1971 | Sogoian | 10/49 |
| 4,478,387 | 10/1984 | Postema | 91/422 X |
| 4,733,436 | 3/1988 | Dochnahl | 16/DIG. 9 X |

FOREIGN PATENT DOCUMENTS 2583844 12/1986 France ...................... 16/51

*Primary Examiner*—Fred A. Silverberg
*Attorney, Agent, or Firm*—Ladas & Parry

[57] ABSTRACT

A door-closer has an air cylinder in which a piston rod and a piston body are provided to define first and second sealed chambers. The piston body is sleeved movably on the piston rod and has a tapered bore which is communicated with the second chamber. A closable passage is formed through the piston and communicated with the first and second chambers. A spring-biased seal is disposed in the second chamber and biased to close the closable passage. A regulatable passage is formed through the piston body and communicated with the tapered bore and the first chamber. The piston rod has a shoulder which is movable axially within the tapered bore by rotating the cylinder relative to the piston rod for regulating the air flow between the first and second chambers through the regulatable passage. The spring-biased seal is movable to open the closable passage when the piston body moves in response to the opening of the door. When the door is opened, compressed air flows from the first chamber to the second chamber through the regulatable passage and the closable passage. When the opened door is released, compressed air flows from the second chamber to the first chamber through the regulatable passage.

4 Claims, 2 Drawing Sheets

PNEUMATIC DOOR-CLOSER HAVING A CLOSABLE PASSAGE AND A REGULATABLE PASSAGE

BACKGROUND OF THE INVENTION

This invention relates to a door-closer, and more particularly to a simple pneumatic door-closer.

A door-closer is a familiar device which can automatically close an opened door. The simplest type of door-closer works merely with a coil spring which has a short useful lifetime. This type of door-closer has the disadvantage that the door is shut rather violently. Pneumatic and hydraulic door-closers have been developed to overcome this problem in accordance with the principle of a shock absorber. Although the door can be closed slowly by such door-closers, the manufacturing cost of the door-closer is increased.

SUMMARY OF THE INVENTION

It is therefore the main object of this invention to provide a simple pneumatic door-closer.

According to this invention, a door-closer includes an air cylinder filled with compressed air, a piston rod movable in the cylinder, and an annular piston means sleeved movably on the piston rod and movable sealingly in the cylinder for defining first and second sealed chambers in first and second end portions of the cylinder respectively. The piston means moves from the second end portion of the cylinder to the first end portion of the cylinder when an associated door which is equipped with the door-closer is opened. The piston means has a piston body. The piston body is sleeved movably on the piston rod and has a tapered central bore which is communicated with the second chamber. A closable passage is formed through the piston body and communicated with the first and second chambers. A spring-biased seal is disposed in the second chamber and biased to close the closable passage. A regulatable passage is formed through the piston body and communicated with the tapered bore and the first chamber. The piston rod has a shoulder which is movable axially within the tapered bore of the piston body by rotating the cylinder relative to the piston rod for regulating the air flow between the first and second chambers through the regulatable passage. The spring-biased seal is movable to open the closable passage when the piston means moves from the second end portion of the cylinder to the first end portion of the cylinder in response to the opening of the door.

When the piston means moves from the second end portion of the cylinder to the first end portion of the cylinder in response to the opening of the door, the increased air pressure in the first chamber urges the spring-biased seal to separate from the closable passage so that compressed air can flow from the first chamber to the second chamber through the closable passage and the regulatable passage.

When the opened door is released, the air pressure accumulated in the first chamber urges the piston means to return from the first end portion of the cylinder to the second end portion of the cylinder in such a manner that compressed air flows from the second chamber to the first chamber through the regulatable passage.

Preferably, a rubber sleeve is sleeved snugly on the shoulder of the piston rod so that the sleeve may be moved to seal the tapered bore of the piston body, thereby stopping the movement of the piston body in the cylinder. When the piston body is positioned in this manner, the door may be located in an open position.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figure 1:
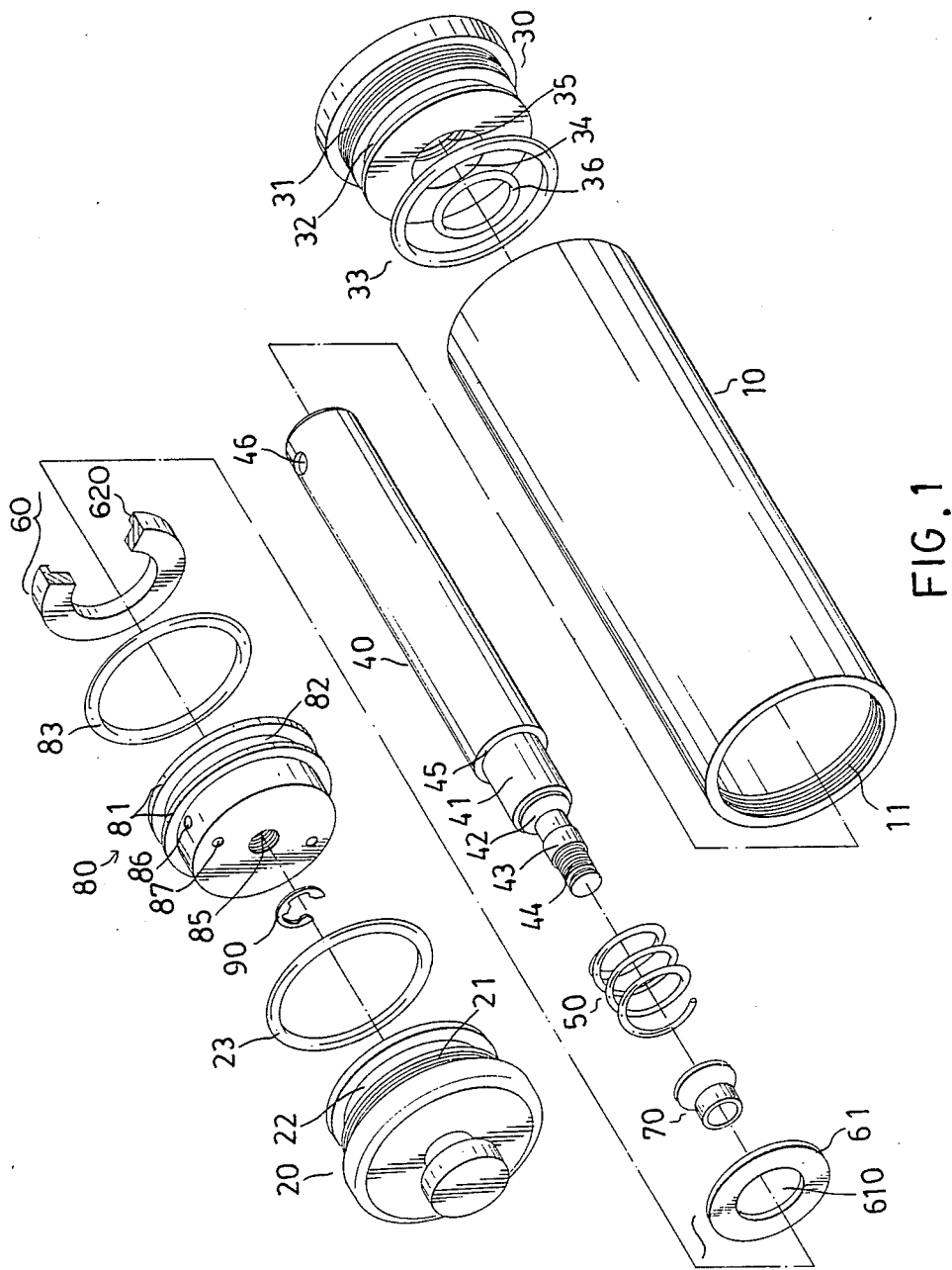
FIG. 1 is an exploded view of a door-closer according to this invention.

Referring to FIG. 1, a pneumatic door-closer of this invention includes a cylinder 10, a cylinder cover 20 sealing the left end of the cylinder 10, a guide ring 30 mounted sealingly in the right end portion of the cylinder 10, a piston rod 40 extending through the guide ring 30 and movable sealingly in the cylinder 10, a compression spring 50 sleeved on the piston rod 40 between the guide ring 30 and a seal means 60, a hopper-like rubber sleeve 70 sleeved tightly on the piston rod 40, a piston body 80 sleeved movably on the piston rod 40, and a C-shaped retaining element 90 fastened to the end of the piston rod 40 for preventing the removal of the piston body 80 from the piston rod 40.

The cylinder 10 has two internally threaded end portions 11 which are respectively engaged with the externally threaded portions 21 and 31 of the cylinder cover 20 and the guide ring 30. The cylinder cover 20 has an annular groove 22 in which a first O ring 23 is received for establishing an air-tight seal between the cylinder 10 and the cylinder cover 20. Similarly, the guide ring 30 has an outer annular groove 32 accommodating a second O ring 33 therein for establishing an air-tight seal between the guide ring 30 and the cylinder 10, a central bore 34, and an inner annular groove 35 accommodating a third O ring 36 therein for establishing an air-tight seal between the guide ring 30 and the piston rod 40. The piston body 80 has an outward flange 81 in which an annular groove 82 is provided to accommodate a fourth O ring 83 therein for establishing an air-tight seal between the piston body 80 and the cylinder 10. An annular space is formed between the piston body 80 and the left end of the rubber sleeve 70. Accordingly, the interior of the cylinder 10 is divided by the piston body 80 into a left chamber A and a right chamber B and filled with compressed air.

The cylinder rod 40 has a spring mounting portion 41 which carries the spring 50 thereon, a tapered shoulder 42 connected to the left end of the spring mounting portion 41, a diameter-reduced head 43 connected to the left end of the shoulder 42 and having an externally threaded end portion 44, and a stepped spring seat 45 connected to the right end of the spring mounting portion 41 for obstructing the right end of the spring 50 from moving to the right. The spring 50 is used to push the seal means 60 away from the spring seat 45 of the piston rod 40. The seal means 60 includes a washer 61, and a rubber ring seal 62 attached to the washer 61. The sleeve 70 is sleeved snugly on the shoulder 42 of the piston rod 40.

As illustrated, the central bore of piston body 80 is generally shaped in conformity with the left end portion of the piston rod 40 and is of a size slightly greater than that of the same so that an annular passage is formed between the left end portion of the piston rod 40 and the right portion of the piston body 80. Because the diameters of the bores 610 and 620 of the washer 61 and the ring seal 62 are much greater than the diameter of the spring mounting portion 41 of the piston rod 40, the annular passage in the piston body 80 is communicates with the the left chamber A and the right chamber B. The central bore of the piston body 80 has a tapered bore portion 84. Internal threads 85 are formed at the left end portion of the piston body 80 so as to engage with the externally threaded portion 44 of the piston rod 40. The piston body 80 has several regulatable passages 86 formed radially therethrough and communicated with the annular passage in the piston body 80 and with the left chamber A, and several closable passages 87 formed axially through the piston body 80 and communicated with the left chamber A and the right chamber B. Normally, the seal means 60 is biased by the spring 50 to close the closable passages 87.

Figure 2:
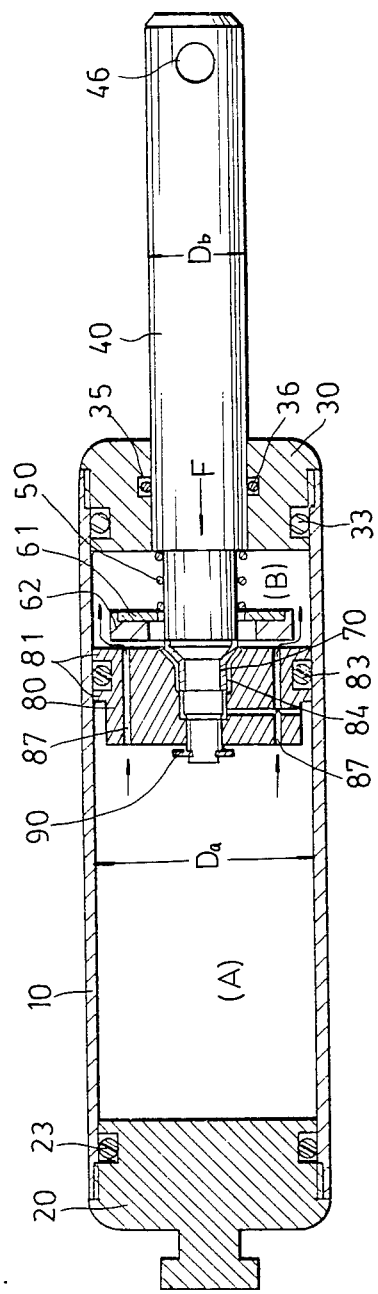
FIGS. 2 and 3 are schematic sectional views illustrating the operation of the door-closer according to this invention.

Referring to FIG. 2, when an associated door which is equipped with the door-closer is opened, a push force is applied to the piston rod 40 in the direction indicated by an arrow F so that the piston rod 40 moves to the left, thereby compressing the air in the left chamber A with the piston body 80. The increased air pressure in the left chamber A will urge the seal means 60 to move away from the piston body 80 against the biase force of the spring 50, thereby permitting the compressed air to move from the left chamber A to the right chamber B through the regulatable passages 86 and the closable passages 87.

Figure 3:
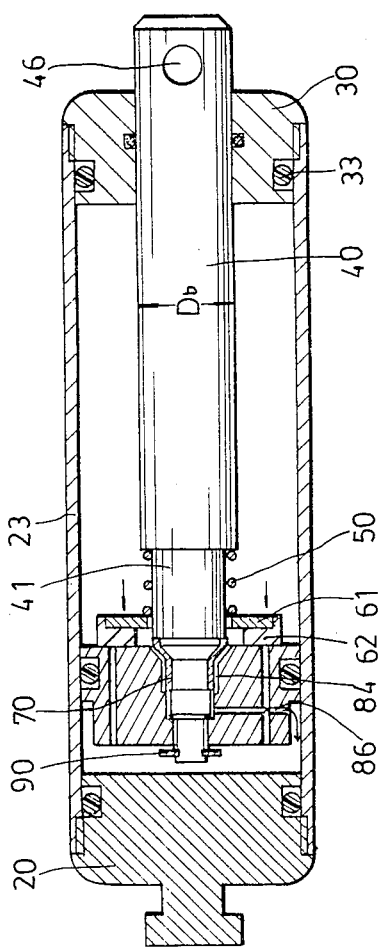

Referring to FIG. 3, when the opened door is released, the push force to the piston rod 40 by the door is eliminated and replaced with the following impelling static forces: (1) the push force Fa of the air pressure in the left chamber A to the piston rod 40 and the piston body 80; (2) the push force Fb of the air pressure in the right chamber B to the piston body 80; and (3) the push force Fc of the atmospheric pressure to the piston rod 40. When the opened door is released, the air pressure in the left chamber A is the same as the air pressure in the right chamber B. Fa is a right-directed force, while Fb and Fc are left-directed forces. Thus, the piston rod 40 will suffer from a right-directed resultant force Fa−Fb−Fc so as to move to the right.

These impelling forces on the piston rod 40 can be expressed by the following formulas:

$$Fa = P \times \pi \times D_a^2 / 4$$

$$Fb = P \times \pi \times (D_a^2 - D_b^2) / 4$$

$$Fc = 1 \text{ atm} \times \pi \times D_b^2 / 4$$

where P is the air pressure in either the left chamber A or the right chamber B, Da is the inner diameter of the cylinder 10, and Db is the diameter of the middle of the piston rod 40.

As a result of these formulas, the force impelling the piston rod 40 to the right = Fa−Fb−Fc = $(P-1) \times \pi \times (D_b)^2 / 4$. For example, when P is 40 atm and Db is 0.8 cm, the resultant impelling force is 19.6 Kg. The resultant impelling force to the piston rod 40 is proportional to the air pressure P in either the left chamber A or the right chamber B, and to the diameter Db of the middle of the piston rod 40.

Certainly, the resultant impelling force to the piston rod 40 will be diminished by the friction force between the cylinder 10 and the fourth O ring 83 carried on the piston body 80.

It is stressed that the spring-biased sell means 60 acts as a check valve whereby the closable passages 87 can be automatically closed when the opened door is released. The closing speed of the door is therefore low.

It can be appreciated that the air flow between the left chamber A and the right chamber B can be regulated in accordance with the principle of a throttle valve. To prevent the rotation of the piston rod 40, a pin hole 46 is formed through the right end portion of the piston rod 40 for the insertion of a pin (not shown) therein. When the cylinder 10 is rotated relative to the piston rod 40, the fourth O ring 83 and hence the piston body 80 rotate. The relative rotation between the piston body 80 and the piston rod 40 permits the annular space between the piston body 80 and the left end of the sleeve 70 to become larger or smaller for regulating the air flow between the left chamber A and the right chamber B through the regulatable passages 86. When the annular space becomes larger, it is easier to open the door.

With the sleeve 70 provided on the shoulder 42 of the piston rod 40, when it is desired to locate the door in an open position, the sleeve 70 can be moved to seal the tapered bore 84 of the piston body 80 by rotating the cylinder 10 relative to the piston rod 40 so that the air flow between the left chamber A and the right chamber B through the regulatable passages 86 is stopped.

With this invention thus explained, it is apparent that numerous modifications and variations can be made without departing from the scope and spirit of this invention. It is therefore intended that this invention be limited only as indicated in the appended claims.

I claim:

1. A door-closer comprising an air cylinder filled with compressed air, a piston rod movable in said cylinder, and an annular piston means sleeved movably on said piston rod and movable sealingly in said cylinder for defining first and second sealed chambers in first and second end portions of said cylinder respectively, said piston means moving from said second end portion of said cylinder to said first end portion of said cylinder when an associated door which is equipped with said door-closer is opened, said piston means including a piston body sleeved movably on said piston rod and having a tapered central bore which is communicated with said second chamber, a closable passage formed through said piston body and communicated with said first and second chambers, a spring-biased seal disposed in said second chamber and biased to close said closable passage, and a regulatable passage formed through said piston body and communicated with said tapered bore and said first chamber, said piston rod having a shoulder which is movable axially within said tapered bore of said piston body by rotating said cylinder relative to said piston rod for regulating air flow between said first and second chambers through said regulatable passage, said spring-biased seal being movable to open said closable passage when said piston means moves from said second end portion of said cylinder to said first end portion of said cylinder in response to opening of said door; whereby, when said piston means moves from said second end portion of said cylinder to said first end portion of said cylinder in response to opening of said door, increased air pressure in said first chamber urges said spring-biased seal to separate from said closable passage so that compressed air can flow from said first chamber to said second chamber through said regulatable passage and said closable passage; when said opened door is released, air pressure accumulated in said first chamber urges said piston means to return from said first end portion of said cylinder to said second end portion of said cylinder in such a manner that compressed air flows from said second chamber to said first chamber through said regulatable passage.

2. A door-closer as claimed in claim 1, wherein said piston rod includes a C-shaped retaining element fastened to an end thereof for retaining said piston body on said piston rod.

3. A door-closer as claimed in claim 1, wherein said piston rod includes a rubber sleeve which is sleeved snugly on said shoulder of said piston rod, whereby, said sleeve may be moved to seal said tapered bore of said piston body so as to stop air flow between said first and second chambers through said regulatable passage.

4. A door-closer as claimed in claim 1, wherein said piston rod has an externally threaded portion, and wherein said piston body has an internally threaded portion engaged with said externally threaded portion of said piston rod, whereby, when said cylinder is rotated relative to said piston rod, said piston body moves slowly on said piston rod.

* * * * *